United States Patent
Kudou

(10) Patent No.: US 6,375,221 B1
(45) Date of Patent: Apr. 23, 2002

(54) MOUNTING STRUCTURE OF SUSPENSION MEMBER

(75) Inventor: Toshihisa Kudou, Shizuoka (JP)

(73) Assignee: Unipres Corporation, Shizuoka (JP)

( * ) Notice: Subject to any disclaimer, the term of this patent is extended or adjusted under 35 U.S.C. 154(b) by 0 days.

(21) Appl. No.: 09/582,281
(22) PCT Filed: Dec. 28, 1998
(86) PCT No.: PCT/JP98/05979
§ 371 Date: Sep. 11, 2000
§ 102(e) Date: Sep. 11, 2000
(87) PCT Pub. No.: WO00/35738
PCT Pub. Date: Jun. 22, 2000

(30) Foreign Application Priority Data

Dec. 16, 1998 (JP) .......................................... 10-358288

(51) Int. Cl.[7] .............................................. B62D 21/11
(52) U.S. Cl. .................................... 280/788; 280/124.1
(58) Field of Search ........................ 280/788, 124.147, 280/124.155, 124.1

(56) References Cited

FOREIGN PATENT DOCUMENTS

| JP | 58-31687 | 7/1983 |
| JP | 3-28009 | 2/1991 |
| JP | 4-169379 | 6/1992 |
| JP | 5-13671 | 4/1993 |
| JP | 8-301140 | 11/1996 |
| JP | 9-132171 | 5/1997 |
| JP | 10-211887 | 8/1998 |

Primary Examiner—Paul N. Dickson
(74) Attorney, Agent, or Firm—Foley & Lardner

(57) ABSTRACT

The present invention relates to a suspension member attaching structure for attaching a suspension member to a vehicle body structure member. A lower reinforcing member 5 is connected to the upper surface of a bottom portion 2C of a front sub-frame 2, which is a vehicle body structure member, by welding or the like, an upper reinforcing member 6 having an upper attachment flat portion 6C located at an intermediate height position of the front sub-frame 2 is provided on the front sub-frame 2, connection Y between the upper reinforcing member 6 and the upper part of a bolt 3 is provided by direct arc welding or the like, and connection X between a collar portion 4 formed at an intermediate portion of the bolt 3 and the lower reinforcing member 5 are provided by arc welding or the like. Thereby, the lower part of the bolt 3 is caused to pass through the lower reinforcing member and the bottom portion 2C of the front sub-frame 2 and is projected from these two members.

2 Claims, 6 Drawing Sheets

MOUNTING STRUCTURE OF SUSPENSION MEMBER

TECHNICAL FIELD

The present invention relates to a suspension member attaching structure for an automobile or the like.

BACKGROUND ART

A suspension mechanism of an automobile or the like has various suspension members (for example, a suspension frame). Conventionally, such a suspension member is attached to a vehicle body structure member (side member, cross member, sub-frame, or the like) by using various types of attaching structures.

First, an automotive suspension mechanism will be explained with reference to FIG. 5. In FIG. 5, reference numeral 40 denotes a suspension member. This suspension member 40 is attached to a member on the lower surface of vehicle body floor via a later-described suspension member attaching structure 41.

The suspension member 40, which is made up of various types of suspension arms 42 (a lower arm 42A rotatably supported in a predetermined geometric relationship, a front upper arm 42B, a rear upper arm 42C, and a lateral link 42D), or a front sub-frame (not shown) or the like, gives a predetermined restraining motion to an illustrated road wheel 43. Reference numeral 44 denotes a shock absorber, and 45 denotes a coil spring.

FIGS. 6 and 7 show conventional suspension member attaching structures.

The suspension member attaching structure shown in FIG. 6 has been disclosed in Unexamined Japanese Patent Publication Nos. 10-211887 and 9-132171. According to this structure, a suspension member attaching structure 41 has a cross member 22 whose flange portion 22A is fixed to the lower surface of a vehicle body floor 21 by welding, and a lower reinforcing member 23 is fixed onto the bottom surface of the cross member 22. To the lower reinforcing member 23, a bolt plate 24 having a fitting hole 24A at the center thereof is fixed by welding at the peripheral portion of the bolt plate 24.

A bolt 25 is attached to the bolt plate 24 by fitting a serrated portion 25A of an intermediate portion of the bolt in the fitting hole 24A. To the upper end portion of the bolt 25 is fixed a separate upper pin 30, and the bolt 25 is fixed to an upper reinforcing member 31 by causing the upper pin 30 to pass through a hole 32 in the upper reinforcing member 31 and by arc welding the upper pin 30. A rising portion 33 at the periphery of the upper reinforcing member 31 is fixed to the cross member 22 by spot welding. A projecting portion of the bolt 25 projecting from the cross member 22 is supported on the suspension member 40 via an insulator in which an elastic material 27C is interposed between an inner cylinder 27A and an outer cylinder 27B. A nut 28 is screwed to a screw portion 25D of the bolt 25, by which the inner cylinder 27A of the insulator 27 is fastened and held via a cover member 29.

The suspension member attaching structure shown in FIG. 7 has been disclosed in Unexamined Japanese Patent Publication No. 10-211887. According to this structure, a pin portion 57 is formed integrally at the upper part of a bolt 53. By caulking the pin portion 57 in an insertion hole 56C in an upper reinforcing member 56, the upper part of the bolt 53 is fixed to the upper reinforcing member 56, a collar portion 54 formed at an intermediate portion of the bolt 53 is held between an embossed member 55D and a bottom surface portion 52C of a cross member 52, and further the bolt 53 is fitted in a through hole 55C in a lower reinforcing member 55.

However, for the suspension member attaching structure shown in FIG. 6, the attachment strength of the bolt 25 (suspension member) depends on a serration fit due to the serrated portion 25A of the bolt 25. Therefore, in order to increase the attachment strength, the bolt plate 24 or the lower reinforcing member 23 itself must be made thick or large. Also, because of the construction in which the attachment strength depends on a serration fit due to the serrated portion 25A, in order to increase a resisting force against a thrust-up force applied to the bolt 25, the hardness of the serrated portion 25A of the bolt 25 must be increased to enhance a force for fitting to the bolt plate 24. To increase the hardness of the bolt 25, the bolt must be subjected to special treatment such as thermal refining when the bolt 25 is manufactured, so that the manufacture of the bolt 25 is made troublesome. Further, because of high hardness of bolt, the bolt 25 cannot be welded directly to the upper reinforcing member 31, so that the separate upper pin 30 with relatively low hardness is needed. For this reason, the alignment of the bolt 25 and the upper pin 30 is difficult to do. Also, it is very difficult to obtain a perpendicular accuracy of the bolt 25 with respect to the cross member 22, coupled with the reason that consideration must be given to the fact that the bolt 25 is fitted so as to be undesirably tilted with respect to the bolt plate 24 because of fitting using the serrated portion 25A.

Also, for the suspension member attaching structure shown in FIG. 7, because the bolt 53 is fixed to the upper reinforcing member 56 by caulking, it is very difficult to obtain a perpendicular accuracy of the bolt 53 with respect to the cross member 52, coupled with the reason that consideration must be given to the fact that the bolt 53 is fitted so as to be undesirably tilted with respect to the bolt plate 54 because of the fitting using the serrated portion 53A. Further, because of the configuration such that the bolt plate 54 is fixed by being held between the bottom surface portion 52C of the cross member 52 and the embossed portion 55D of the lower reinforcing member 55, the flatness between the bottom surface portion 52C of the cross member 52 and the bolt plate 54 and between the bolt plate 54 and the embossed portion 55D affects the perpendicular accuracy of the bolt 53 with respect to the cross member 52. Therefore, it is difficult to obtain the perpendicular accuracy of bolt for this reason as well.

Accordingly, an object of the present invention is to provide a suspension member attaching structure in which a resisting force against a thrust-up force applied to a bolt is increased without the increase in hardness of the bolt, and moreover the perpendicular accuracy of bolt is obtained easily.

DISCLOSURE OF THE INVENTION

To achieve the above object, the suspension member attaching structure in accordance with the present invention is configured so that a lower reinforcing member is connected to the upper surface of a bottom portion of a vehicle body structure member by welding, an upper reinforcing member is provided at an intermediate height position of the vehicle body structure member, the upper part of a bolt is fixed directly to the upper reinforcing member by welding such as arc welding, a collar portion formed at an intermediate portion of the bolt is fixed to the lower reinforcing member by welding such as arc welding, and the lower part of the bolt passes through the lower reinforcing member and the bottom portion of the vehicle body structure member and projects from these two members.

According to the above-described configuration, the upper part of bolt is fixed directly to the upper reinforcing member by welding such as arc welding, and the collar portion of bolt is fixed to the lower reinforcing member by welding such as arc welding. As a result, as compared with the conventional configuration using a fitting system using a separate pin or a serrated portion, a resisting force against a thrust-up force applied to the bolt can be increased, and moreover the perpendicular accuracy with respect to the vehicle body structure member can be assured easily.

BEST MODE FOR CARRYING OUT THE INVENTION

Next, preferred embodiments of the present invention will be described with reference to the accompanying drawings.

Figure 1:
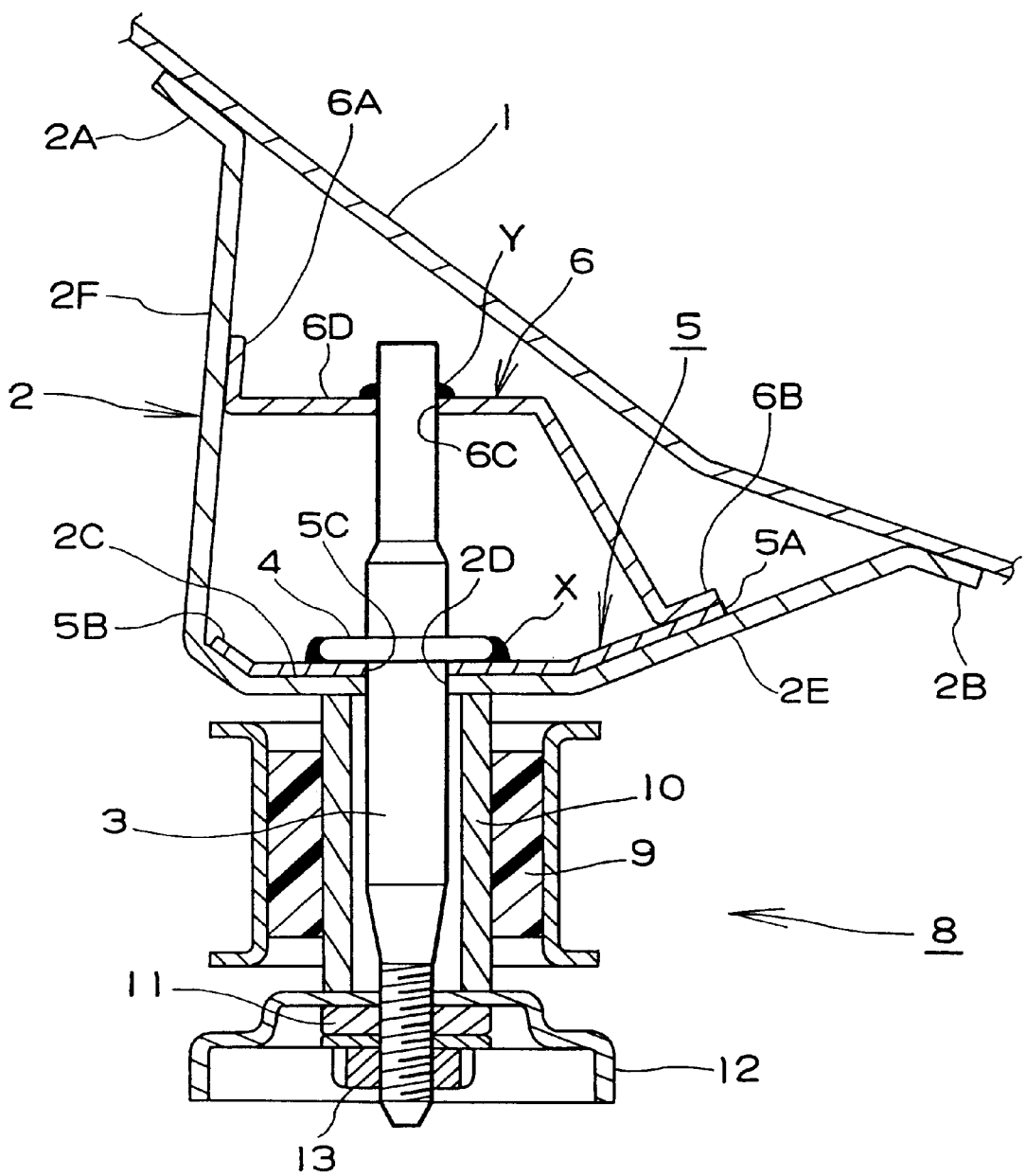
FIG. 1 is a longitudinal sectional view of a suspension member attaching structure in accordance with one embodiment of the present invention.
Figure 2:
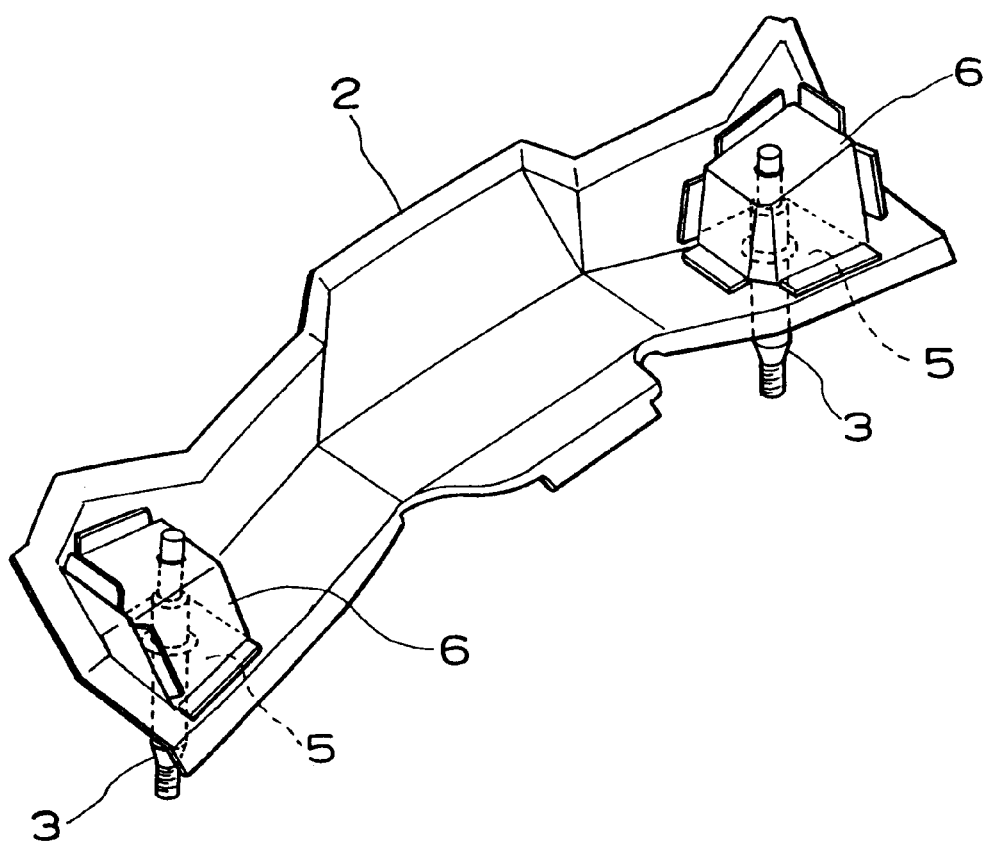
FIG. 2 is a perspective view of a front sub-frame, which is a vehicle body structure member, to which the embodiment in FIG. 1 is applied.

FIG. 1 is a longitudinal sectional view of a suspension member attaching structure in accordance with one embodiment of the present invention, and FIG. 2 is a perspective view of a front sub-frame used in this embodiment in FIG. 1.

In FIG. 1, this suspension member attaching structure has a front sub-frame 2 whose flange portions 2A and 2B are fixed to the lower surface of a vehicle body floor 1 by welding. A bottom portion 2C of the front sub-frame 2 is formed with a through hole 2D, and a bolt 3 is inserted and fitted in the through hole 2D. An intermediate portion of the bolt 3 is formed with a collar portion 4. The vehicle body floor 1 and the front sub-frame 2 constitute vehicle body structure members.

Reference numeral 5 denotes a lower reinforcing member, which has a plate shape as a basic shape. At both ends of the lower reinforcing member 5 are formed flange portions 5A and 5B which are joined to the upper surface of the bottom portion 2C of the front sub-frame 2. Also, the lower reinforcing member 5 is interposed between the bottom portion 2C of the front sub-frame 2 and the collar portion 4, and connection X with the collar portion 4 is provided by arc welding or the like on the upper surface thereof. For this purpose, a through hole 5C for inserting and fitting the bolt 3 is formed at a substantially central portion of the lower reinforcing member 5.

Reference numeral 6 denotes an upper reinforcing member. An attachment flat portion 6D of the upper reinforcing member 6 is formed with an insertion hole 6C whose diameter is smaller than that of the through hole 2D, the upper part of the bolt 3 is fitted in the through hole 6C, and connection Y between the bolt 3 and the upper reinforcing member 6 is provided by arc welding or the like. At both ends of the upper reinforcing member 6 are formed flange portions 6A and 6B. The flange portions 6A and 6B are connected to a vertical wall portion 2F and an inclined portion 2E connecting the bottom portion 2C of the front sub-frame 2 to the flange portion 2B, respectively.

Reference numeral 8 denotes a suspension frame as a suspension member. A bolt collar 10 is provided in the suspension frame 8 via an insulator 9. Reference numeral 11 denotes a two-piece washer, 12 denotes a cover member, and 13 denotes a nut.

Next, an assembling method will be explained.

First, the lower part of the bolt 3 is caused to pass through and fitted in the through hole 5C of the lower reinforcing member 5 and the through hole 2D of the front sub-frame 2. The lower surface of the collar portion 4 is brought into contact with the upper surface of the lower reinforcing member 5 fixed to the bottom portion 2C of the front sub-frame 2. In this state, connection X between the surrounding of the collar portion 4 and the lower reinforcing member 5 is provided by arc welding or the like.

Next, the upper part of the bolt 3 is inserted in the insertion hole 6C of the attachment flat portion 6D of the upper reinforcing member 6, and is projected slightly. Connection Y between the projected portion and the upper reinforcing member 6 is provided by arc welding or the like.

Since the above connection X is provided before the upper reinforcing member 6 is fixed, the welding work of arc welding or the like is easy to do. Also, since the connection Y is provided in a state of a part before the front sub-frame 2 is fixed to the lower part of the vehicle body 1, the welding work of arc welding or the like at this portion is also easy to do.

According to this embodiment of the present invention configured as described above, the configuration is used such that the bolt 3 is fixed directly to the upper reinforcing member 6 by arc welding or the like at the upper portion thereof, and is fixed to the lower reinforcing member 5 by arc welding or the like at the collar portion 4 thereof. As a result, as compared with the conventional configuration using a fitting system using a separate pin or a serrated portion, a resisting force against a thrust-up force applied to the bolt 3 can be increased, and moreover the perpendicular accuracy with respect to the front sub-frame 2 can be assured easily.

Consequently, special treatment such as thermal refining for increasing the hardness of the bolt 3 is not needed, and also the thickness of the lower reinforcing member 5 and the upper reinforcing member 6 can be decreased, which contributes to the lighter weight of vehicle.

Also, since the bolt 3 is fixed directly to the upper reinforcing member 6 by the connection Y, unlike the conventional structure, a separate pin with low hardness necessary for welding the bolt with high hardness to the upper reinforcing member is not needed, and work for installing the pin to the bolt can be eliminated.

Figure 3:
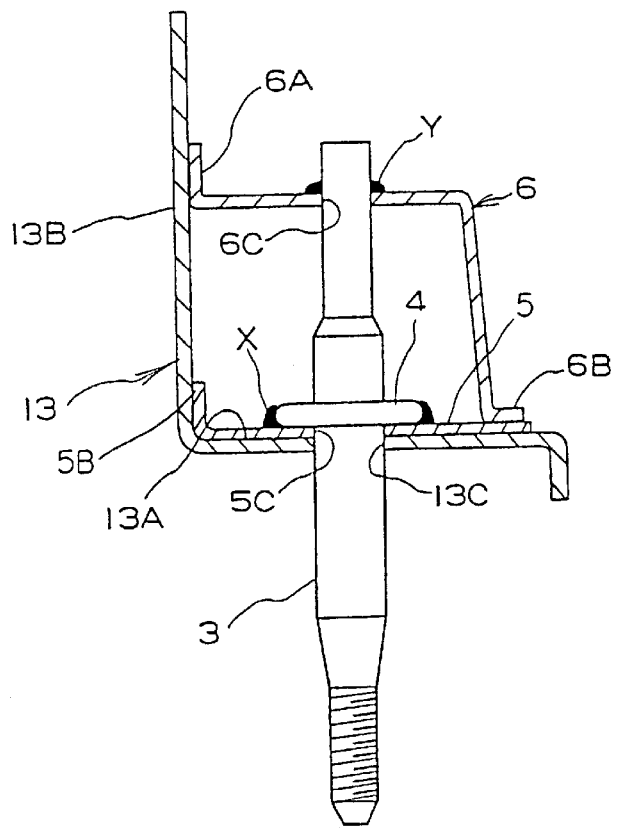
FIG. 3 is a longitudinal sectional view of a suspension member attaching structure in accordance with another embodiment of the present invention.
Figure 4:
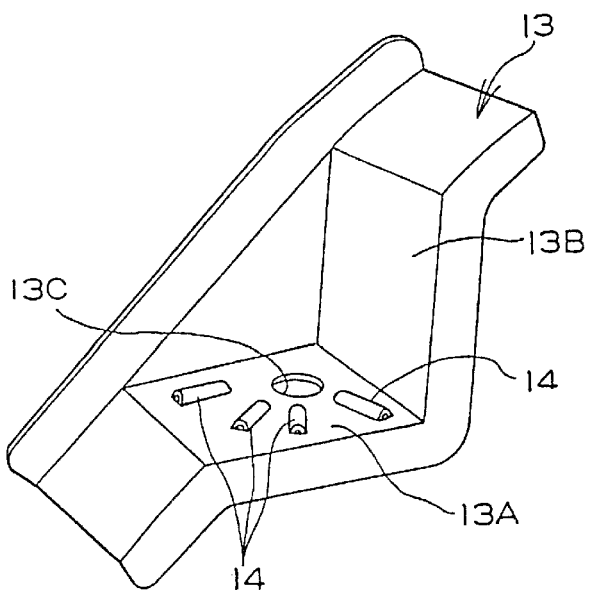
FIG. 4 is a perspective view of a bracket shown in FIG. 3, viewed from the back face side.
Figure 5:
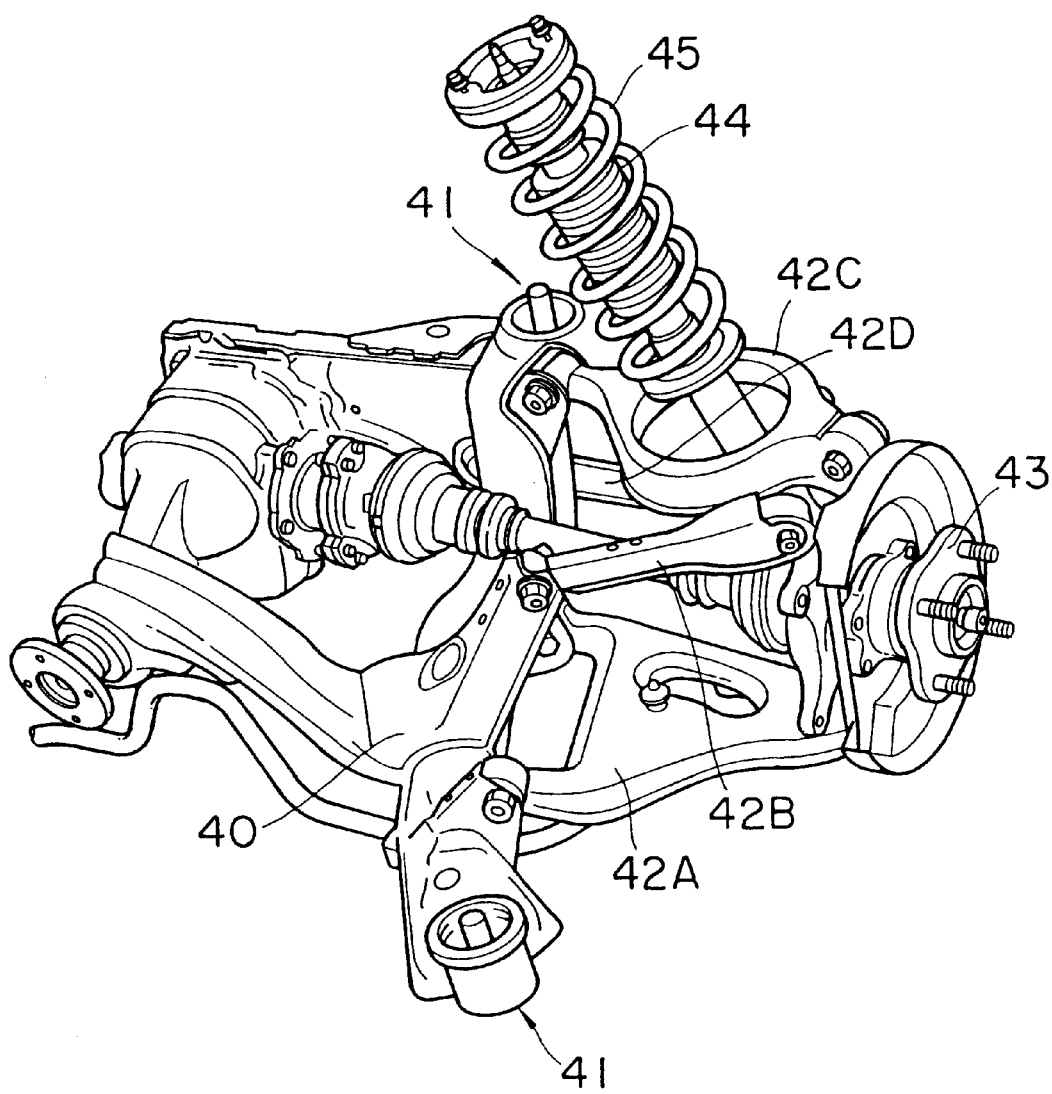
FIG. 5 is a perspective view of an automotive suspension.
Figure 6:
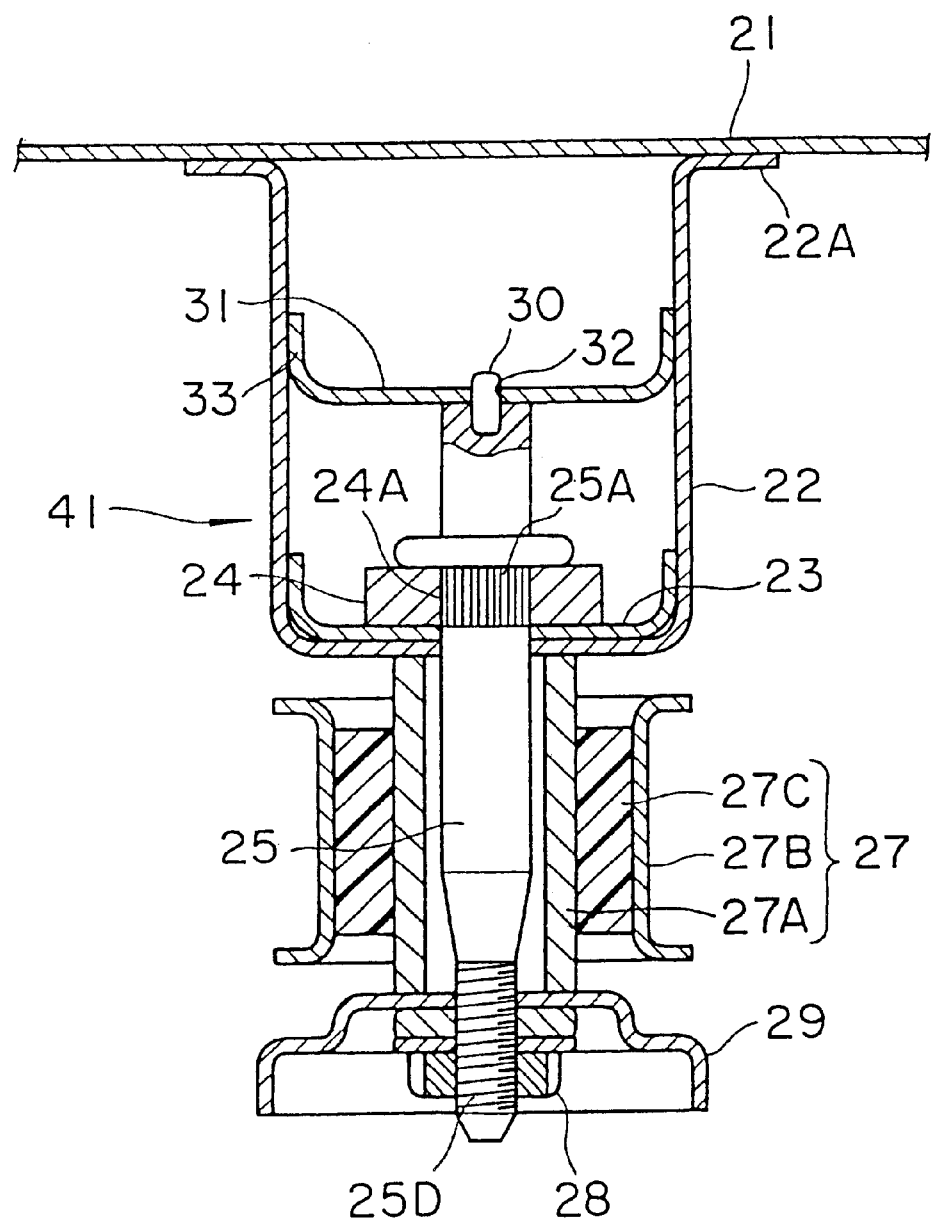
FIG. 6 is a longitudinal sectional view of a conventional suspension member attaching structure.
Figure 7:
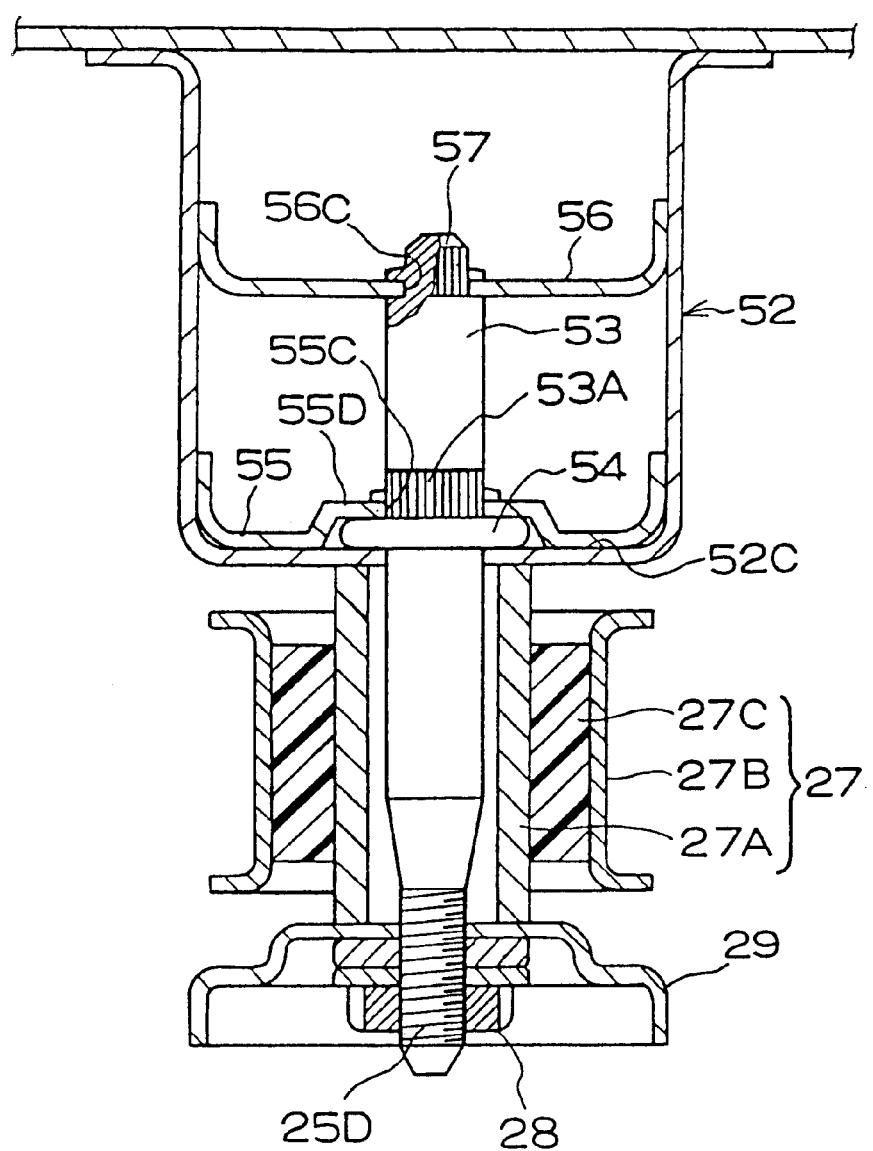
FIG. 7 is a longitudinal sectional view of another conventional suspension member attaching structure.

FIGS. 3 and 4 show another preferred embodiment of the present invention. FIG. 3 is a longitudinal sectional view thereof, and FIG. 4 is a perspective view of a bracket used for this embodiment, viewed from the lower face side.

According to this embodiment, a lower reinforcing member 5 and an upper reinforcing member 6 are not installed directly to a vehicle body structure member such as a front side-frame, but are installed to a bracket 13 interposed to attach the vehicle body member to the vehicle body 7.

Specifically, the bracket 13 has an attachment flat portion 13A formed into a step shape, and the attachment flat portion 13A forms a bottom portion 5b of the lower reinforcing member 5. Also, a flange portions 6A and 6B of the upper reinforcing member 6 are fixed to a vertical wall 13B of the bracket 13 and the attachment flat portion 13A, respectively.

Like the above-described embodiment, a through hole 13C is formed in the attachment flat portion 13A of the bracket 13, and a bolt 3 is inserted and fitted in the through hole 13C. An intermediate portion of the bolt 3 is formed with a collar portion 4.

The lower reinforcing member 5 is interposed between the upper surface of the bottom portion 13A of the bracket 13 and the collar portion 4. On the upper surface of the lower reinforcing member 5, connection X is provided by arc welding or the like. For this purpose, a through hole 5C for inserting and fitting the bolt 3 is formed at a substantially central portion of the lower reinforcing member 5.

The upper reinforcing member 6 is formed with an insertion hole 6 with a diameter smaller than that of the through hole 13C. The upper part of the bolt 3 is fitted in the insertion hole 6C, and connection Y is provided by arc welding or the like.

Also, as shown in FIG. 4, on the back face of the bottom portion 13A of the bracket 13, a plurality of beads 14 are formed projectingly so as to surround the through hole 13D, by which the rigidity of the bottom portion 13A is increased.

A suspension member 8 is not shown in FIG. 3.

In this embodiment of the present invention configured as described above as well, the configuration is used such that the bolt 3 is fixed directly to the upper reinforcing member 6 by arc welding or the like at the upper portion thereof, and is fixed to the lower reinforcing member 5 by arc welding or the like at the collar portion 4 thereof. As a result, as compared with the conventional configuration using a fitting system using a separate pin or a serrated portion, a resisting force against a thrust-up force applied to the bolt 3 can be increased, and moreover the perpendicular accuracy with respect to the bracket 13 can be assured easily.

Consequently, special treatment such as thermal refining for increasing the hardness of the bolt 3 is not needed, and also the thickness of the lower reinforcing member 5 and the upper reinforcing member 6 can be decreased, which contributes to the lighter weight of vehicle.

Also, since the bolt 3 is fixed directly to the upper reinforcing member 6 by the connection Y, unlike the conventional structure, a separate pin with low hardness necessary for welding the bolt with high hardness to the upper reinforcing member is not needed, and work for installing the pin to the bolt can be eliminated.

Further, since the plurality of beads 14 are formed on the lower face of the attachment flat portion 13A of the bracket 13 to increase the rigidity, the thickness of the bracket 13 can be decreased, which contributes to the lighter weight of vehicle.

INDUSTRIAL APPLICABILITY

The present invention provides a suspension member attaching structure in which a lower reinforcing member is connected to the upper surface of a bottom portion of a vehicle body structure member by welding, an upper reinforcing member is provided at an intermediate height position of the vehicle body structure member, the upper part of a bolt is fixed directly to the upper reinforcing member by welding such as arc welding, a collar portion formed at an intermediate portion of the bolt is fixed to the lower reinforcing member by welding such as arc welding, and the lower part of the bolt passes through the lower reinforcing member and the bottom portion of the vehicle body structure member and projects from these two members. Therefore, the upper part of bolt is fixed directly to the upper reinforcing member by welding such as arc welding, and the collar portion of bolt is fixed to the lower reinforcing member by welding such as arc welding, so that as compared with the conventional configuration using a fitting system using a separate pin or a serrated portion, a resisting force against a thrust-up force applied to the bolt can be increased, and moreover the perpendicular accuracy with respect to the vehicle body structure member can be assured easily.

As a result, special treatment such as thermal refining for increasing the hardness of the bolt is not needed, and also the thickness of the lower reinforcing member and the upper reinforcing member can be decreased, which contributes to the lighter weight of vehicle.

Also, since the bolt is fixed directly to the upper reinforcing member by welding, unlike the conventional structure, a separate pin with low hardness necessary for welding the bolt with high hardness to the upper reinforcing member is not needed, and work for installing the pin to the bolt can be eliminated.

As described above, the suspension member attaching structure in accordance with the present invention is useful as an attaching structure for attaching the suspension member to the vehicle body structure member (side member, cross member, sub-frame, or the like). This structure can increase a resisting force against a thrust-up force applied to the bolt, and moreover easily provides the perpendicular accuracy with respect to the vehicle body structure member.

What is claimed is:

1. A suspension member attaching structure in which a lower reinforcing member is connected to the upper surface of a bottom portion of a vehicle body structure member by welding, an upper reinforcing member is provided at an intermediate height position of said vehicle body structure member, the upper part of a bolt is fixed directly to said upper reinforcing member by welding, a collar portion formed at an intermediate portion of said bolt is fixed to said lower reinforcing member by welding, and the lower part of said bolt passes through said lower reinforcing member and the bottom portion of said vehicle body structure member and projects from said lower reinforcing member and said bottom portion.

2. The suspension member attaching structure according to claim 1, wherein a plurality of bead portions are formed on the lower surface of the bottom portion of said vehicle body structure member so as to surround said bolt.

* * * * *